Figure 1:
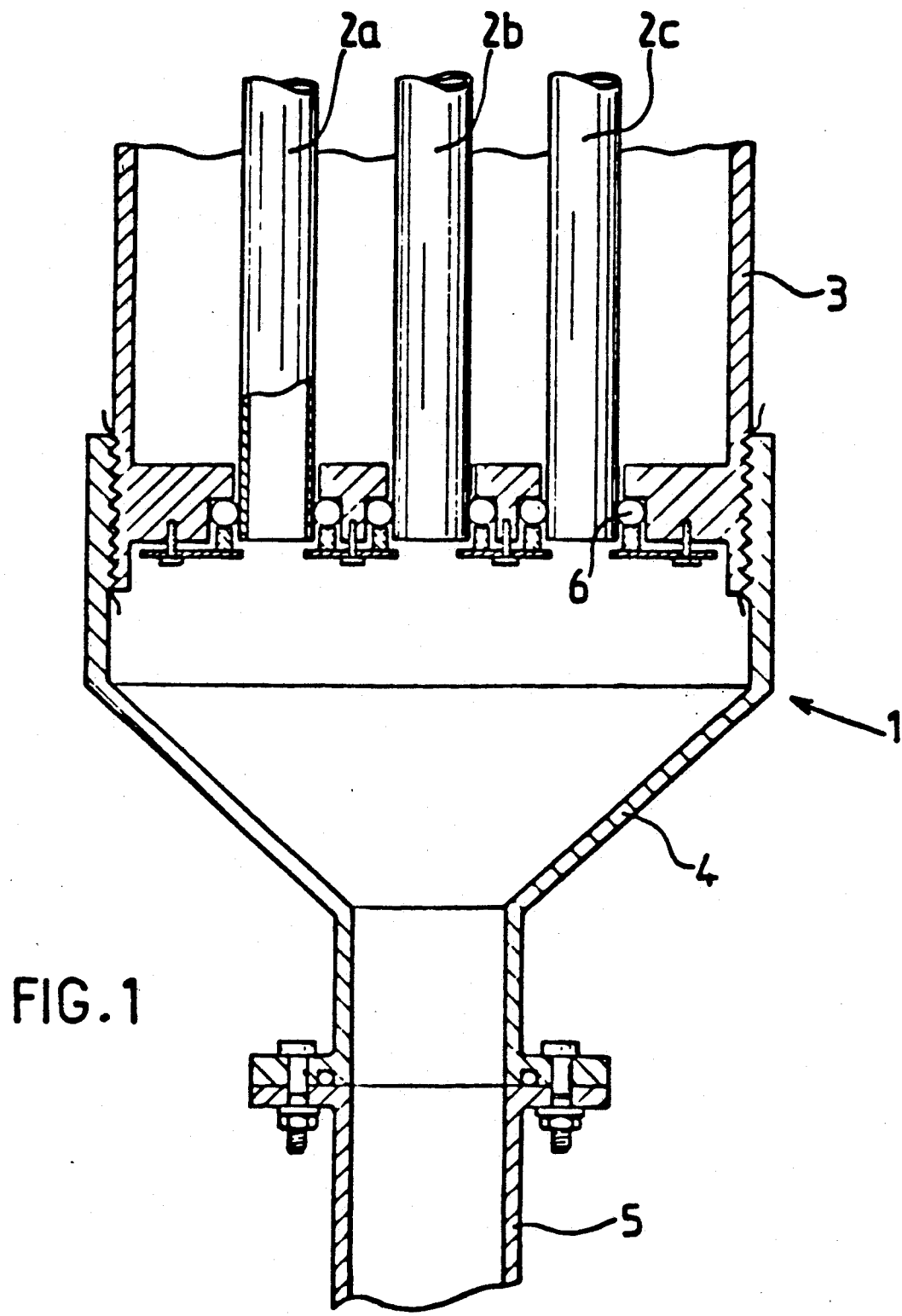

United States Patent [19]

Sigaud et al.

[11] Patent Number: 5,074,989
[45] Date of Patent: Dec. 24, 1991

[54] PROCESS FOR THE SEPARATION OF FINE CATALYST PARTICLES FOR A HYDROCARBON FEEDSTOCK BY FILTRATION THROUGH MINERAL BARRIES AND A FILTRATION LOOP

[75] Inventors: Jean B. Sigaud, Vaucresson; Jean Rossarie, Le Havre, both of France

[73] Assignee: Compagnie de Raffinage et de Distribution Total France, Paris, France

[21] Appl. No.: 639,756

[22] Filed: Jan. 11, 1991

Related U.S. Application Data

[60] Continuation-in-part of Ser. No. 342,725, Apr. 24, 1989, abandoned, which is a division of Ser. No. 142,264, Jan. 8, 1988, abandoned, which is a continuation of Ser. No. 911,486, Sep. 25, 1986, abandoned.

[30] Foreign Application Priority Data

Sep. 25, 1985 [FR] France ................................ 85 14193

[51] Int. Cl.$^5$ ...................... C10G 35/00; C10G 35/10
[52] U.S. Cl. .................................... 208/161; 208/162; 208/164; 208/100; 208/340; 208/101; 208/104; 210/109; 210/110
[58] Field of Search ............... 208/161, 162, 340, 100, 208/101, 104, 164; 210/109, 110, 115, 33, 32

[56] References Cited

U.S. PATENT DOCUMENTS

| | | | |
|---|---|---|---|
| 2,447,149 | 8/1968 | Wier | 208/162 X |
| 2,715,603 | 8/1955 | Lanning et al. | 208/162 X |
| 2,772,214 | 11/1956 | Langer, Jr. | 208/162 X |
| 2,776,930 | 1/1957 | McKeague et al. | 208/102 X |
| 2,879,224 | 3/1959 | Lawson | 208/162 X |
| 2,981,416 | 4/1961 | Lawlor | 210/323.2 |
| 3,341,023 | 9/1967 | Seter | 210/323.2 |
| 3,606,016 | 9/1971 | Sasaki | 210/65 |
| 3,849,294 | 11/1974 | Hansen | 208/162 |
| 3,977,967 | 8/1976 | Trulson et al. | 210/500 |
| 4,003,822 | 1/1977 | Jo | 208/104 X |
| 4,060,488 | 11/1977 | Hoover et al. | 210/500 |
| 4,111,814 | 9/1978 | Knigge | 210/332 |
| 4,285,805 | 8/1981 | Stegelman | 208/188 |
| 4,372,854 | 2/1983 | Sugimoto et al. | 210/739 |
| 4,411,790 | 10/1983 | Arod et al. | 210/500 |

Primary Examiner—Helane E. Myers
Attorney, Agent, or Firm—A. Thomas S. Safford

[57] ABSTRACT

This invention relates to a process for the separation of fine catalyst particles from a hydrocarbon feedstock coming from a catalytic cracking unit by filtration through mineral barriers and a filtration loop.

The process consists of filtering the feedstock through mineral barriers that are resistant to heat and have a porosity adapted to the minimum diameter of the particles to be retained. The porosity is generally between 0.1 and 100 microns.

13 Claims, 2 Drawing Sheets

PROCESS FOR THE SEPARATION OF FINE CATALYST PARTICLES FOR A HYDROCARBON FEEDSTOCK BY FILTRATION THROUGH MINERAL BARRIES AND A FILTRATION LOOP

This application is a continuation-in-part of application Ser. No. 342,725, filed Apr. 24, 1989, now abandoned, which is a FWC division of application Ser. No. 142,264, filed Jan. 8, 1988 now abandoned and which in turn was a FWC continuation of application Ser. No. 911,486, filed Sept. 25, 1986 now abandoned.

This invention relates to separation techniques. More particularly, it relates to a process for the separation of fine catalyst particles from a hydrocarbon feedstock coming from a catalytic cracking unit and to a filtration loop for the practice of such a process.

Hereafter in this specification, hydrocarbon feedstock means a feedstock composed mainly of hydrocarbons which may contain, in addition to carbon and hydrogen atoms, other atoms such as oxygen, sulfur, etc. Such feedstocks may consist primarily, but not solely, of crude petroleum or of products obtained by the refining of crude petroleum, as, for example, the residue, known as slurry, obtained after catalytic cracking, as will be described further on, without this choice constituting any limitation of the present invention.

Catalytic cracking is a widely known process which consists of breaking down the molecules contained in a hydrocarbon feedstock by the action of heat in the presence of catalysts, typically in a fluidized bed. For this reason, the catalyst consists of fine particles whose average size is about 70 microns. A portion of the catalyst, made up of the smallest particles, is carried along by the reaction products and becomes concentrated in the residue which is drawn off at the bottom of the fractionating column.

This residue is used as a cutter stack (a low-viscosity base) in the production of industrial fuel oils.

The presence of fine catalyst particles of a size which usually ranges from 0 to 50 microns, which cannot be removed by conventional filtration means, has the effect of rendering the product unfit for certain uses (as marine fuel oil, for example) and of causing severe fouling of boilers and industrial furnaces by combining with certain heavy metals, such as the vanadium contained in other components of the fuel oil, for example, the viscous bases of the vacuum-residue type.

The situation tends to become worse as the catalytic cracking capacity increases, and with it the production of slurry, while on the other hand the production of viscous bases is declining and the concentration of heavy metals in these bases is increasing.

Separation of the catalyst fines from the cracking residue thus becomes a necessity, and various separation processes have therefore been tested and then proposed to the various refineries.

Among the various prior-art processes is the process for separation by hydrocyclone and by electrophoresis, also known as the Gulftronic process.

However, by reason of the principle on which they are based, these processes only permit a portion of the fines contained in the slurry to be removed, and their cost increases rapidly when higher efficiency is sought. Moreover, the discharge of the fines so separated calls for the use of an external fluid, generally the feedstock from the cracking unit itself, which leads to a recycling of the catalyst fines to the reactor, and hence to a perpetuation of the situation, unless this effluent is discarded and a substantial loss is taken in upgrading the crude.

The applicants have therefore sought to develop a more efficient separation process capable of removing the particles with a diameter greater than a minimum diameter called the cutoff diameter completely by concentrating them in the slurry itself, which makes it possible to discharge them outside the system at lower cost.

To this end, the separation process is characterized in that the hydrocarbon feedstock is filtered through mineral barriers of a porosity adapted to the minimum diameter of the particles to be retained, which generally is between 0.1 and 100 microns.

These barriers, which today are commercially available, are in the form of a cylindrical tube with an inside diameter that varies, generally between 1 and 15 mm, made of a mineral material such as alumina or carbon and internally covered with one or more layers of metallic oxides. These barriers are described in greater detail in U.S. Pat. No. 4,411,790 (based on French priority Patent Application No. 80 11 442, filed on May 22, 1980,) in the names of the Atomic Energy Commission and of Compagnie Frangaise de Raffinage, being there shown in the form of ultrafiltration barriers as used particularly in reclaiming used oil.

Such barriers are being marketed in France by Societe Francaise d'Eléments Catalytiques (SFEC) under various commercial designations pertaining to the active substances entering into the composition of the inner layers or of the supporting layer and with precise physical characteristics concerning their porosity, mechanical stability, etc.

The various nonobvious uses to which they are put may lead to various patent applications, as is the case with the aforesaid application and with the present application, considering that the filtration by conventional means of a medium as heterogeneous as a petroleum feedstock is very difficult or even impracticable.

In accordance with an embodiment of the present invention, a filtration loop comprises, apart from flow-rate measuring and control means, optional means for measuring and controlling the speed of circulation of the concentrate within the loop, and additional means for measuring the temperature of the concentrate within the loop.

In a variant of this embodiment, the loop is distinguished by the fact that in addition, the flow rate of the filtrate is controlled by a simple valve, while the flow rate of the concentrate is adjusted to a given set point by means of a proportioning valve.

The following description making reference to the accompanying drawings, which are nonlimitative, will provide a better understanding of how the invention is practiced, and hence a better appreciation of its scope. In the drawings, FIG. 1 is a sectional view of a filtration module, and FIG. 2 is a diagrammatic representation of the filtration process as applied to the separation of catalyst fines from the catalytic cracking residue (slurry).

Shown in FIG. 1 is a microfiltration module 1 consisting of a plurality of mineral barriers 2a, 2b and so forth which are parallel-connected in a cell 3. An adaptor cone 4 unites the cell 3 with the circulating pipe 5 by means of a bolted joint. The concentrate circulating in the loop enters the module through pipe 5, circulates in the interior of the barriers 2, and then exits through a pipe that is not shown on the figure. The filtrate is the fraction of the feedstock which passes through the barriers 2, from the interior to the exterior, by reason of the pressure difference existing between these two zones, which may be as high as about ten bars and even higher. To assure imperviousness between the high-pressure zone formed by the pipe 5 and the interior of the barriers 2 on the one hand and the low-pressure zone formed by the exterior of the barriers 2 on the other hand, sealing means in the form of O-ring or cylindrical seals 6 made of a fluroelastomeric synthetic rubber, such as Viton ®, produced by E. I. Du Pont de Nemours & Co., or graphite, depending on the temperature of the concentrate which circulates in the loop, must be provided.

Figure 2:
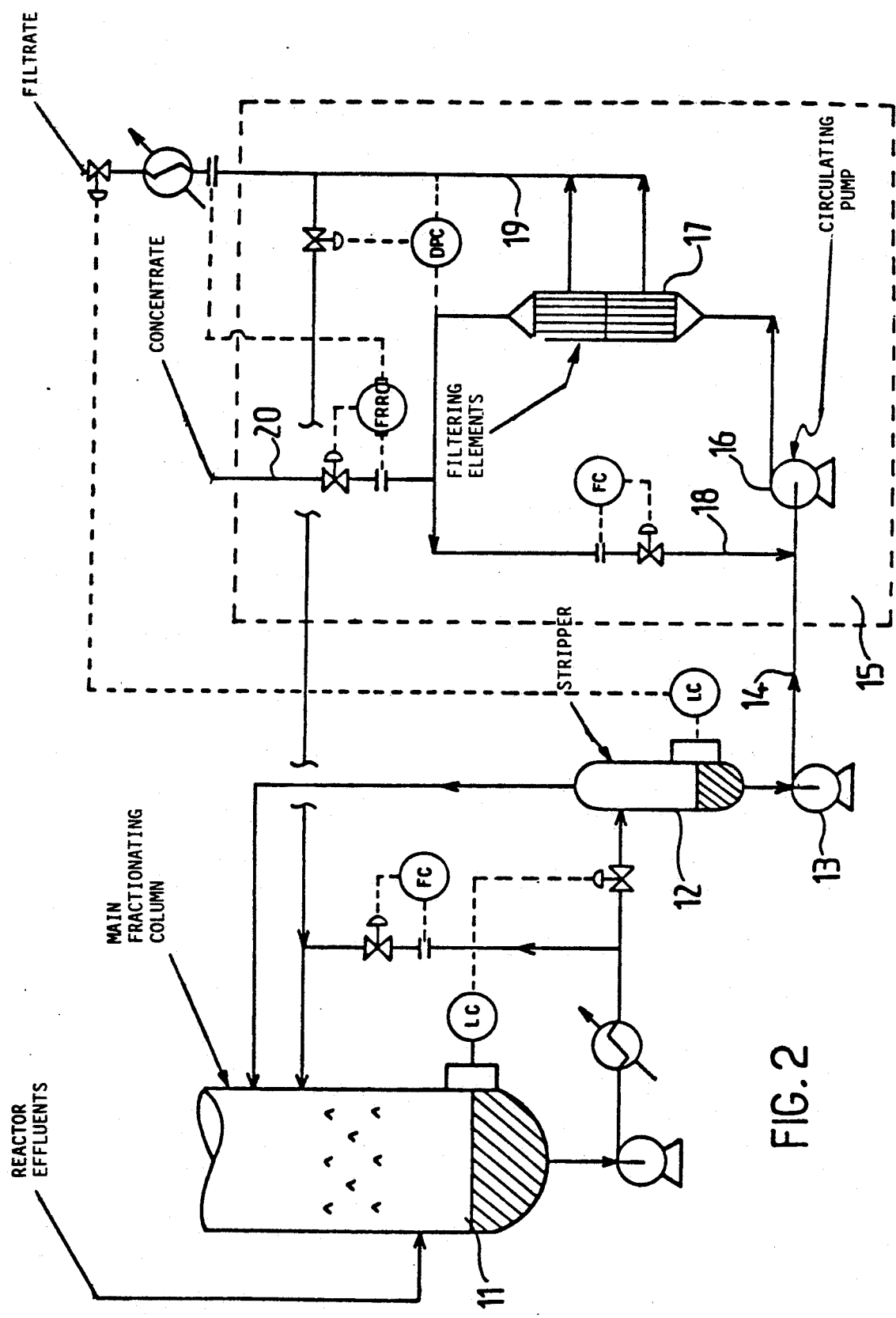

Shown in FIG. 2 is a diagram of a catalytic cracking installation comprising a filtration loop in accordance with the present invention.

A fractioning column of a catalytic cracking unit is designated 11.

Such a column, and more generally, the catalytic cracking unit, as well as its operating or regulating conditions, will not be described further in this specification. Reference may be made to basic texts on the subject, such as Wuithier, vol. I, chap. II. From such a column 11, a cracking residue is drawn off and first steam-stripped in a column 12 and then routed by way of the feed pump 13 and the feed pipe 14 to the filtration loop 15, which is the specific object of the invention.

The residue or slurry drawn off, which carries fine catalyst particles, as explained earlier, is introduced into the filtration loop 15 through the feed pipe 14. Said loop comprises a circulating pump 16, a series-parallel array 17 (for example, four modules of 250 barriers each in series, mounted as described in connection with the preceding figure) of barriers 2, and a circulating pipe 18. A filtrate discharge pipe 19 and a concentrate discharge pipe 20 are also provided to permit on the one hand the collection in a storage tank (not shown) of a hydrocarbon feedstock free of fine particles and on the other hand the discharge of the concentrate. Finally, such a loop 15 . is provided with measuring and control means, such as a flow control, designated FC, a temperature control, designated TC, and optionally a circulation speed control, designated SC. Moreover, there are connections so far as the control means are concerned between the filtration loop and the catalytic cracking unit. Thus, the flow rate of the filtrate is controlled by a level control, designated LC, which measures the level in the stripping column 12. Similarly, recycling of the filtrate to the main fractionating column 11 is controlled by the measurement of the difference in the pressure (DPC) between the high- and low-pressure zones, of the filtration loop and of the filtrate outlet. Finally, the concentrate flow rate is controlled by the filtrate flow rate in such a way that the ratio between these two flow rates is maintained at the desired value by means of a proportioning valve (FRRC).

Mineral barriers designed for equipping a filtration loop are characterized by their permeametric radii. These barriers are commercially available with permeametric radii of from 2 to 100 nm as a first range (which involves ultrafiltration), of from 0.1 to 100 microns as a second range, used in this particular type of application (involving microfiltration).

The impurities present in the hydrocarbon feedstock introduced into the filtration loop are retained by these barriers while the feedstock itself which contained these impurities (in suspension or in solution, as the case may be) filters through the sensitive layers that form the inner wall of the barriers. The concentration of impurities consequently increases in the loop until it reaches an equilibrium level that is defined by the flow rates at which the filtrate and the concentrate are drawn off, or, more accurately, by the ratio between these two flow rates, known as the concentration ratio, which is adjusted by means of a proportioning valve mounted in the concentrate outlet. Concentrate thus circulates within this loop and is continuously drawn off in such a way that the incoming stream (the hydrocarbon feedstock, for example, a slurry) is equal to the outgoing stream (filtrate and concentrate). Finally, such a system is self-cleaning, the concentrate circulating in the loop being moved at high tangential speed by the circulating pump so that it continually cleans the surface of the sensitive inner layer of the barriers and carries with it all impurities which were unable to pass through this layer or these layers. This constant cleaning has no or very little adverse effect on the sensitive layers; the various tests run by the applicants showed that the barriers had a relatively long service life of over one year. In the event that a barrier or all of the barriers of a module should become clogged as consequence of a mishap or of improper operating conditions, it may be necessary to carry out an unclogging operation, which can be done quite readily by exerting a backpressure from the exterior to the interior of the barriers, by circulating the concentrate through the loop without any being drawn off, and with or without promotion of turbulence, or by draining the loop and introducing a suitable fluid therein, which then is circulated. These unclogging fluids vary widely and generally depend on the feedstock which normally circulates inside the barriers. They are typically solvents and include, for example, the light catalytic diluent in cases where a feedstock consisting of a slurry is used.

EXPERIMENTAL TEST

The applicants have conducted a test under actual operating conditions of such a loop on the pilot filtration system which applicants assignee maintains in its Research Center and which is equipped with suitable barriers.

Said pilot system is equipped with a module of three barriers representing a filtering surface area of 0.066 $m^2$. This test was carried out during 100 hours, after stabilization of the concentration ratio at 20, under the following operating conditions:

Temperature: 330° C.
Pressure at outlet of barriers: 4.5 bars
Flow rate: 5 meters/second The contents of catalyst fines (of an average diameter of about 20 microns) of the feedstocks, the filtrate and the concentrate were 1500 ppm, less than 50 ppm, and 3 percent, respectively. The analysis of these contents was effected by PCAS 118 filtration. The yield in filtrate was of the order of 95 percent.

INDUSTRIAL TEST

These results were held to be sufficiently encouraging to justify the construction on an industrial site of a demonstration loop of a modular design operated by the applicants and readily permitting enlargement and maintenance.

It is obvious from the foregoing description that numerous modifications or variants may be conceived by one skilled in the art without departing from the scope of the present invention, as defined in the accompanying claims. In particular, such a process will be applicable with the same efficiency to other types of solids present in the slurry (coke, rust, etc.) and will not depend on their particle size so far as the porosity of the barriers used is concerned. Moreover, it may be applied to any other type of feedstock for the purpose of separating the solid fraction (or a large portion thereof) from the liquid fraction.

What is claimed is:

1. A method of recovering catalyst fines from a fluid catalytic cracking unit, wherein such fines are concentrated in a concentration loop, which method comprises fractionating the effluent from said fluid catalytic cracking unit in a column to produce a residue containing catalyst fines at the bottom of the fractionating column, pumping said residue to route it into a concentration loop, continuously circulating the residue in the loop, microfiltering said residue through a filtering means to obtain a filtrate essentially free of said catalyst fines, discharging a portion of the concentrate circulating in the loop, which concentrate is rich in said catalyst fines, and recycling said discharged concentrate to the fluid catalytic cracking unit.

2. The method according to claim 1, in which the catalyst fines from the effluent coming from a fluid catalytic cracking unit, are between 20 and 100 microns in diameter, with an average size at least on the order of 70 microns in diameter.

3. The method according to claim 1, wherein the filtering means is in the form of a series-parallel array of mineral barriers, each having a cylindrical tube made of a mineral substance internally covered with fragile layers of oxide, having a porosity adapted to the minimum diameter of the particles to be retained, which porosity ranges between 0.1 and 100 microns.

4. The method according to claim 3, wherein the minimum porosity is 1 micron.

5. The method according to claim 3, wherein the porosity is about 1 micron.

6. The method according to claim 4, wherein the maximum porosity is 50 microns.

7. The method according to claim 5, wherein the maximum porosity is 30 microns.

8. The method according to claim 7, wherein the maximum porosity is 10 microns.

9. The method according to claim 1, wherein the ratio of the flow rate of the filtrate to the concentrate is higher than 2 and lower than 100.

10. The method according to claim 9, wherein the ratio of the flow rate of the filtrate to the concentrate is maintained at about 20.

11. The method according to claim 7, wherein the ratio of the flow rate of the filtrate to the concentrate is higher than 2 and lower than 100.

12. The method according to claim 4, wherein the ratio of the flow rate of the filtrate to the concentrate is maintained at about 20.

13. In a fluid catalytic cracking process conducted in the presence of a catalyst subject to attrition, characterized by the progressive production of catalyst fines, the improvement comprising the steps of concentrating the catalyst fines in a slurry by means of a concentration loop, and recycling the concentrate rich in catalyst fines to a fluid catalytic cracking unit.

* * * * *